D. Newton,
Roller for Tin Ware.
Nº 16,804.　　　Patented Mar. 10, 1857.
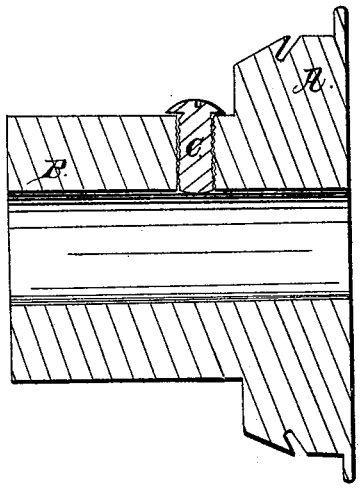

UNITED STATES PATENT OFFICE.

DANIEL NEWTON, OF SOUTHINGTON, CONNECTICUT.

IMPROVED ROLLER FOR BENDING SHEET METAL.

Specification forming part of Letters Patent No. 16,801, dated March 10, 1857.

*To all whom it may concern:*

Be it known that I, DANIEL NEWTON, of Southington, in the county of Hartford and State of Connecticut, have invented a new and useful Improvement in a Roller for Setting Down and Double-Seaming Tin and Copper Ware; and I do hereby declare that the following is a full and exact description thereof, reference being had to the accompanying drawing, and to the letters of reference marked thereon.

The nature of my invention consists in preparing the outside roller for double-seaming with an angular groove turned into it, in which the seam runs in the first revolution, thus setting it down or pressing the seam together and bending it over both at the same instant.

To enable others skilled in the art to make and use my invention, I will proceed to describe its construction and operation.

I make a roller, A, four to five inches in diameter and about three-fourths of an inch thick, with a hub, B, in the center, which contains a set-screw, C, for the convenience of fastening in any required position. On the outside of the roller is a flange or projection which is designed to press against the bottom of the vessel in the second revolution while the seam is being finished. About one-fourth of an inch from the flange in the surface of the roller is turned a groove in an angle of about forty-five degrees from the axis of the same. This groove is made of suitable width and depth for the admission of the seam, and will vary according to the work it is designed to do; but common tinware will require the groove about one-eighth of an inch deep and about one-sixteenth wide. The corners are slightly taken off in order to fully admit the same.

This roller being applied to any double-seaming machine containing two parallel shafts for doing the work, the roller pressed with screw or otherwise onto the seam which enters the groove, and by turning the crank the seam in the first revolution is pressed together and bent about half-way over. The roller is then slightly raised, and the shaft to which the roller is attached moved about one-fourth of an inch to the right hand, thus bringing the flange firmly against the bottom of the vessel. Then by renewing the pressure and turning the crank the work is completed.

What I claim as my invention, and desire to secure by Letters Patent, is—

The application to double-seaming machines of a roller containing an angular groove in which the seam runs in the first revolution, substantially as herein described.

DANIEL NEWTON.

Witnesses:
J. S. BARNES,
C. M. BARNES.